United States Patent [19]
Grossi et al.

[11] Patent Number: 5,633,649
[45] Date of Patent: May 27, 1997

[54] RADAR SYSTEM AND COMPONENTS THEREFORE FOR TRANSMITTING AN ELECTROMAGNETIC SIGNAL UNDERWATER

[75] Inventors: Mario D. Grossi, Cambridge, Mass.; Mark A. Seferian, Tiverton; Michael G. Soyka, Warren, both of R.I.

[73] Assignee: Raytheon Company, Lexington, Mass.

[21] Appl. No.: 493,774

[22] Filed: Jun. 22, 1995

Related U.S. Application Data

[63] Continuation of Ser. No. 80,251, Jun. 21, 1993, abandoned.

[51] Int. Cl.$^6$ .......................... H01Q 11/08; H01Q 1/00
[52] U.S. Cl. .......................... 343/895; 343/788; 343/876; 343/705
[58] Field of Search .......................... 343/895, 787, 343/788, 876, 705, 707, 709; H01Q 11/08, 1/00

[56] References Cited

U.S. PATENT DOCUMENTS

| | | | |
|---|---|---|---|
| 3,972,044 | 7/1976 | Alford | 343/848 |
| 4,323,900 | 4/1982 | Krall et al. | 343/895 |
| 4,712,112 | 12/1987 | Carr | 343/895 |
| 4,760,362 | 7/1988 | Maki | 343/895 |
| 4,845,506 | 7/1989 | Shibata et al. | 343/876 |
| 5,081,468 | 1/1992 | Williams | 343/895 |
| 5,220,338 | 6/1993 | Matsushita | 343/895 |
| 5,268,703 | 12/1993 | Wingard | 343/895 |

OTHER PUBLICATIONS

"Air/Undersea Communication at Ultra–Low–Frequencies Using Airborne Loop Antennas," A. C. Fraser–Smith et al., Stanford Electronics Laboratories, Jun. 1977, Technical Report No. 4207–6, pp. iii–vii–1–75.

*Primary Examiner*—Hoanganh T. Le
*Attorney, Agent, or Firm*—Donald F. Mofford

[57] ABSTRACT

An antenna for transmitting electromagnetic signals having a frequency less than 500 Hz includes a beam of dielectric material and a conductive sheet wound in a helical pattern around the beam of dielectric material. The antenna further includes a core fabricated from a silicon and iron alloy, the cote disposed between the beam of dielectric material and the conductive sheet. With such an arrangement, a magnetic dipole antenna is provided capable of providing a magnetic moment of approximately $10^6$ to $10^7$ Am$^2$.

16 Claims, 8 Drawing Sheets

RADAR SYSTEM AND COMPONENTS THEREFORE FOR TRANSMITTING AN ELECTROMAGNETIC SIGNAL UNDERWATER

This application is a continuation of application Ser. No. 08/080,251 filed Jun. 21, 1993, now abandoned.

BACKGROUND OF THE INVENTION

This invention relates to radar systems and more particularly to a radar system and components therefore for transmitting an electromagnetic signal from above the surface of water to below the surface of water to detect anomalies below the surface of water.

As is known in the art, it is often desirable to detect the present of objects under the surface of water. Typically, conventional underwater detection systems operate on acoustic principles. That is, acoustic energy is transmitted in the water medium and echo return signals are received and processed to determine the presence of objects. However, acoustic signal propagation requires a transmitting transducer and a receiving transducer be disposed in the water medium. If an underwater detection system is utilized from an aircraft (i.e. airplane, helicopter, etc.), then the transmitting transducer and the receiving transducer must be suspended from a cable or a towline attached to the aircraft with the transmitting transducer and the receiving transducer disposed below the water's surface.

Unfortunately, such an arrangement reduces the mobility of the aircraft and the rate of searching capability of the system. Thus, it is desirable to not require transducers disposed in the water for an underwater detection system utilized from an aircraft.

An alternative technique for detecting objects is utilizing a radar system transmitting electromagnetic signals. Electromagnetic signals propagate effectively in air and couple suitably to sea water. Unfortunately, electromagnetic signals do not propagate well in a water medium wherein the signals are subjected to a high rate of attenuation. In sea water, an electromagnetic signal is typically attenuated 8.68 dB per skin depth. Skin depth is frequency dependent and typically with a frequency of 1 Hz, the skin depth is 252 meters, with a frequency of 100 Hz, the skin depth is 25.2 meters and with a frequency of 10 KHz, the skin depth is only 2.52 meters. If a signal having a frequency of 100 Hz is propagating through sea water a distance of 1,000 meters, then the signal would have travelled a distance of approximately 40 skin depths which equals 347 dB of attenuation. From the latter, it should be appreciated that it is desirable to use relatively low frequency electromagnetic signals if the signal is required to penetrate the surface of the water a significant amount of distance.

An electric antenna for transmitting an electromagnetic signal is typically a multiple of an one-half wavelength or variant thereof such that the electromagnetic signal is resonant with the antenna. At frequencies approaching 100 Hz, a signal has a wavelength in air so long that an electric antenna is not practical for use in an aircraft. An alternative antenna for a signal with a frequency of 100 Hz, is a magnetic dipole antenna for transmitting the electromagnetic signal. One such antenna is described in a publication entitled "Air/Undersea Communication at Ultra-Low-Frequencies Using Airborne Loop Antennas" by A. C. Fraser-Smith, D. M. Bubenik and O. G. Villard, Jr. wherein a loop antenna is described for use in an airplane. However, such an antenna is large and spanned the entire aircraft. Also the antenna had a large inductance, which may not be a problem in some instances, but is typically not desirable.

SUMMARY OF THE INVENTION

With the foregoing background in mind, it is an object of this invention to provide a radar system for transmitting a signal underwater and distinguishing an echo return signal of interest from a return signal caused from the water surface.

Another object of this invention is to provide a radar system capable of detecting an anomaly, or conductivity disturbance, beneath the surface of water.

Another object of this invention is to provide a radar system capable of detecting a plume of oil disposed beneath the surface of water.

Another object of this invention is to provide a radar system capable of detecting a wake from a vessel moving beneath the surface of water, if and when the motion of the vessel causes a conductivity perturbation.

Still another object of this invention is to provide a magnetic dipole antenna capable of providing a magnetic moment of approximately $10^5$ to $10^7$ $Am^2$.

The foregoing and other objects of this inventions are met generally by a radar system including a transmitter for transmitting a pulsed electromagnetic signal having a frequency less than 500 Hz and a receiver for receiving a (scattered) reflected signal provided from the pulsed electromagnetic signal (scattered) reflected from an anomaly below the surface of the water. The radar system further includes a switch for inhibiting the receiver from receiving a reflected signal provided from the pulsed electromagnetic signal reflected from the surface of the water and a signal processor for controlling interoperability of the transmitter, the receiver and the switch. With such an arrangement, a radar system is provided for detecting anomalies such as a wake of a moving vessel (if and when this produces a conductivity anomaly), or a plume of oil beneath the surface of water.

In accordance with a further aspect of the present invention, an antenna for transmitting electromagnetic signals having a frequency less than 500 Hz includes a beam of dielectric material and a conductive sheet wound in a helical pattern around the beam of dielectric material. The antenna further includes a core fabricated from a silicon and iron alloy, the core disposed between the beam of dielectric material and the conductive sheet. With such an arrangement, a magnetic dipole antenna is provided capable of providing a magnetic moment of approximately $10^6$ to $10^7$ $Am^2$.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Figure 1:
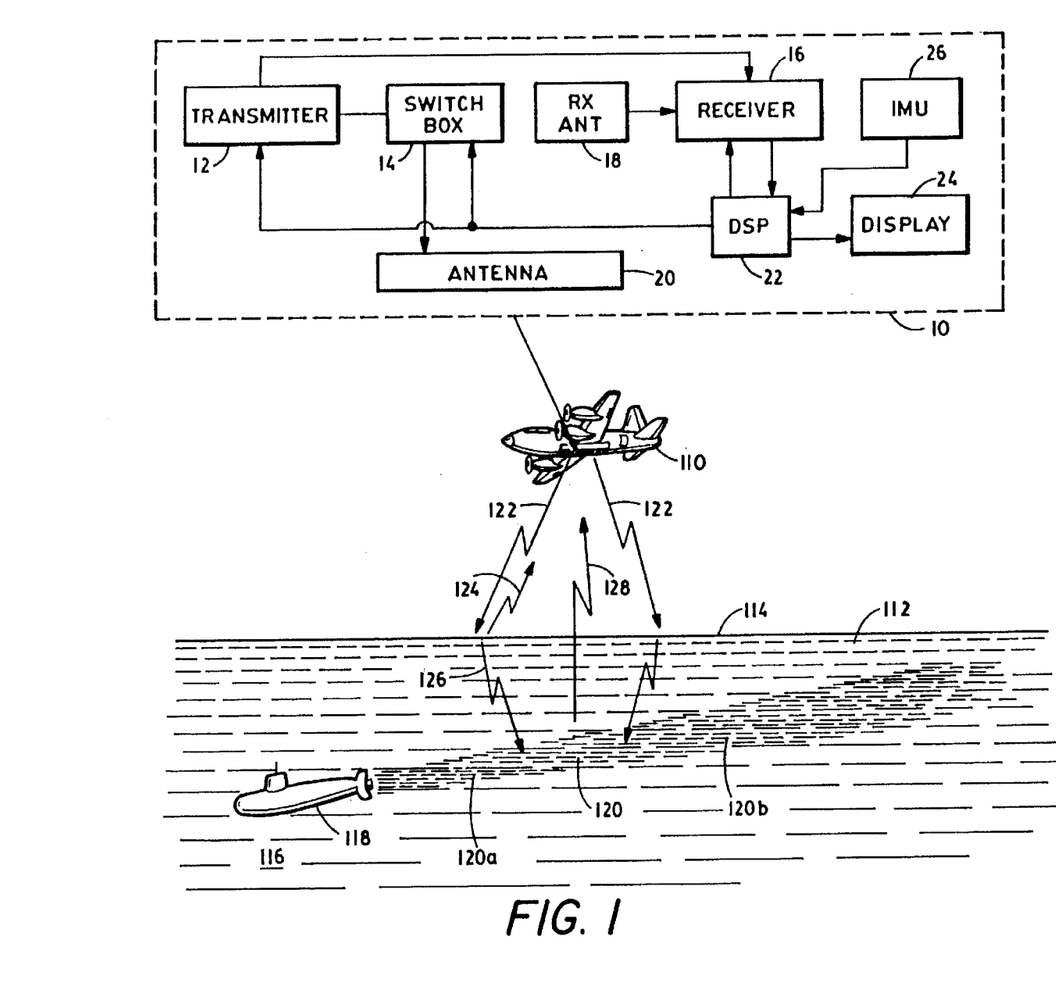
FIG. 1 is a simplified block diagram of a radar system mounted in an aircraft in a typical engagement according to the invention.

Referring now to FIG. 1, a radar system 10 mounted within an aircraft 110 is shown to include a transmitter 12 for transmitting electromagnetic signals. An output of the transmitter 12 is connected to a switch box 14 which is coupled to a transmit antenna 20, here a horizontal magnetic dipole. The radar system further includes a receive antenna 18 connected to a receiver 16 and a digital signal processor (DSP) 22 which provides control signals to the transmitter 12, the switch box 14 and the receiver 16. The DSP 22 is also connected to the receiver 16 to receive signals from the receiver 16 and also is connected to a video display 24. An inertial measurement unit (IMU) 26 is connected to the DSP 22 to provide the DSP 22 with navigational information (i.e. height above surface, etc.).

The transmitter 12 is adapted to provide a pulsed electromagnetic signal having a frequency below 500 Hz in a manner as described in more detail hereinafter. Suffice it to say here that the electromagnetic signal from the output of the transmitter 12 is coupled to the antenna 20 by the switch box 14 in response to a control signal from the DSP 22. The switch box 14 is adapted, in response to the control signal from the DSP 22, to either connect or disconnect the transmitter 12 with the antenna 20. The antenna 20 will, when connected to the transmitter 12, emanate an electromagnetic signal 122 toward a surface 114 of sea water 112. A portion of the electromagnetic signal 122 is reflected by the surface 114 of the sea water 112 as a first reflected signal 124 and a portion of the electromagnetic signal 122 will enter below surface 116 of the sea water 112 as an underwater signal 126. The underwater signal 126 will propagate through the sea water 112 until striking a disturbance 120 wherein a portion of the underwater signal 126 is reflected as a second reflected signal 128. The second reflected signal 128 will propagate through the sea water 112 until reaching the surface 114 wherein the second reflected signal will enter the air and propagate toward the aircraft 110. A portion of the second reflected signal 128 will strike the antenna 18. The antenna 18 will capture that portion of the second reflected signal 128 incident thereon and couple the signal to the receiver 16. The receiver 16 processes such incident signal to detect the presence of objects, for example, a submarine 118 or here the disturbance 120.

As described hereinabove, electromagnetic signals can propagate in water, however the depth of penetration is inversely related to the frequency of the electromagnetic signal. More particularly, in sea water, an electromagnetic signal is attenuated at a rate of 8.68 dB per skin depth. Typically, a signal having a one-way loss greater than 25 dB in the sea water is too weak to provide useful detection information by the time it is processed by the radar system 10. Thus, the one-way depth of penetration for satisfactory return signals is approximately three times the skin depth of the electromagnetic signal (we assume here that we have available enough reserve in Signal-to-Noise ratio to afford a total round trip of 6 skin depths). Knowing the latter, a one Hz signal having a skin depth of approximately 252 meters can satisfactorily propagate to a depth of 756 meters, whereas a 100 Hz signal having a skin depth of approximately 25.2 meters can satisfactorily propagate to a depth of approximately 75 meters. From the latter, it should now be appreciated that it is desirable for the electromagnetic signal to have an extra low frequency, preferably in the range from 40 Hz to one Hz. Basic parameters of propagation of electromagnetic waves having a frequency of one, ten, 75 and 100 Hz are shown in Table I.

TABLE I

| Frequency (Hz) | Skin Depth δ (meters) | Wavelength (meters) | Skin Depth δ Attenuation (dB) | Phase Velocity (meters/sec) | Two-way Phase Delay (msec/100 m) |
| --- | --- | --- | --- | --- | --- |
| 1 | 252.0 | 1,583 | 8.68 | 1,583 | 126 |
| 10 | 79.7 | 500 | 8.68 | 5,000 | 40 |
| 75 | 29.1 | 182.8 | 8.68 | 13,710 | 14.6 |
| 100 | 25.2 | 158.3 | 8.68 | 15,830 | 12.6 |

In view of the above, as the submarine 118 is travelling below the surface 114, a disturbance 120 (i.e. a wake) is left behind the submarine 118. It should be noted that, if the sea water is suitably stratified, the wave 120 is detectable well after the submarine 118 passed by. Possibly, the wake 120 may be detectable for two or three hours after the submarine has passed. If the submarine is travelling at a speed of eighteen knots, it is 18 to 36 nautical miles away from the point at which the wake is detected. A first portion 120a of the wake 120 closer to the submarine 118 will have a narrower width than a second portion 120b of the wake 120 farther from the submarine 118. Thus, as the aircraft 110 flies overhead and detects the wake 120, if the aircraft 110 flies in a zigzag pattern detecting the width of the wake 120, the operator on the aircraft 110 can determine the direction of travel of the submarine 118. Now the aircraft 110 can continue to fly in a zigzag pattern continuously intersecting the wake 120 to determine the course of travel until the aircraft 110 catches up to the submarine 118 (it detects at that point the scattering from the hull).

Figure 1A:
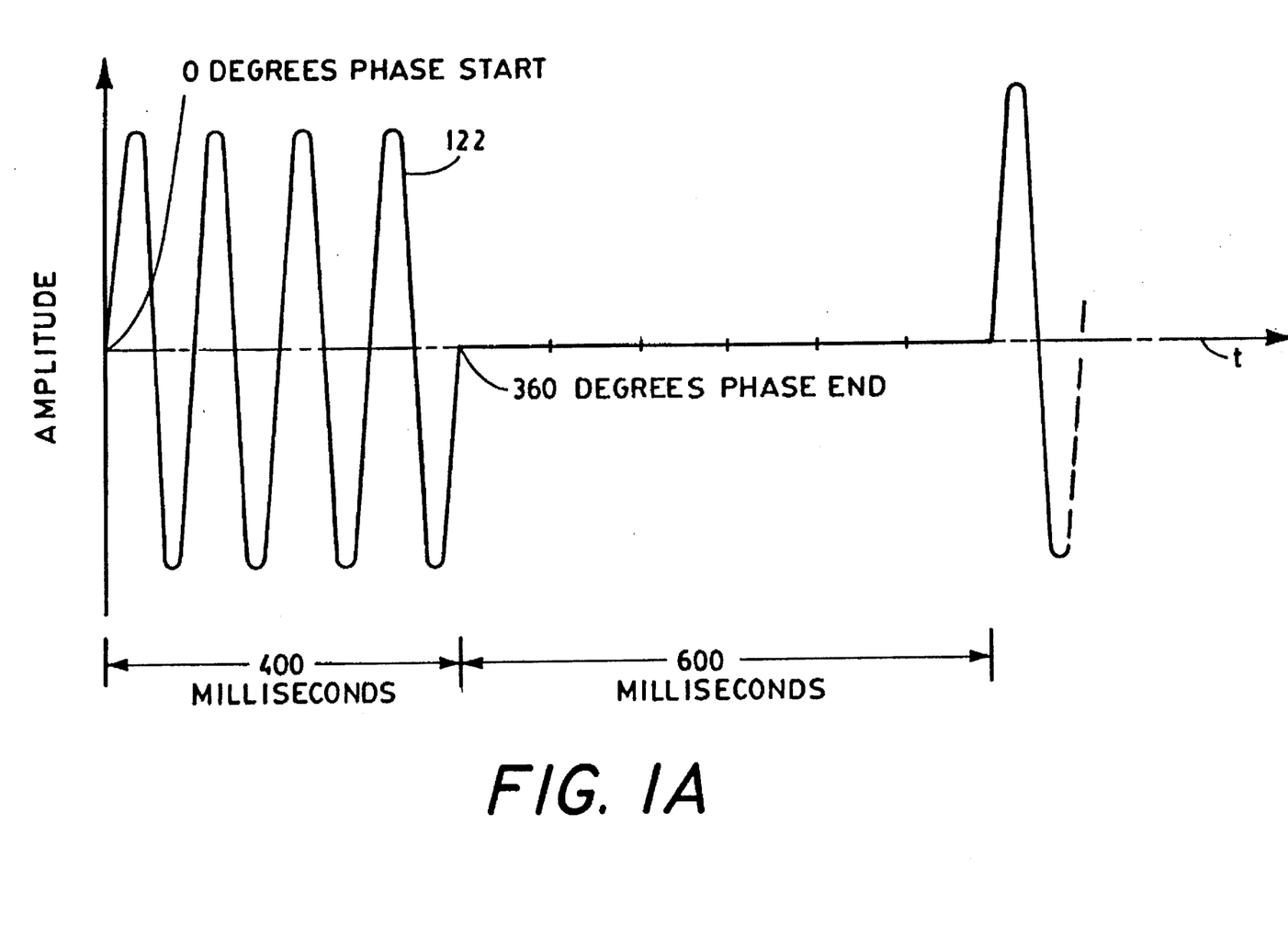
FIG. 1A is a diagram of a plot of the transmitted signal transmitted by the radar system of FIG. 1.
Figure 1B:
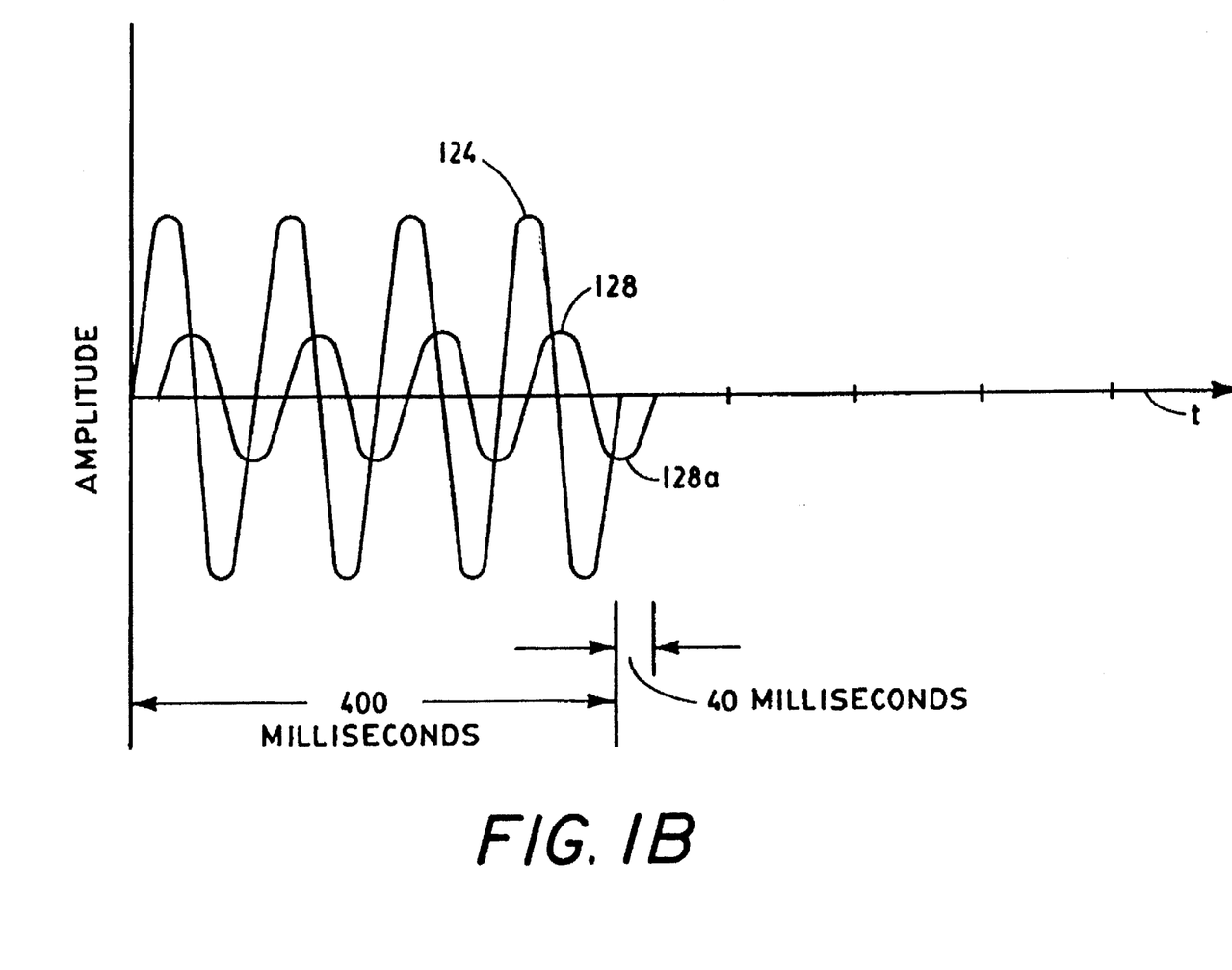
FIG. 1B is a diagram of a plot of the received signals received by the radar system of FIG. 1.

Referring now to FIGS. 1, 1A and 1B, operation of the radar system 10 is explained. The transmitter 12 is capable of providing a pulsed electromagnetic signal having a frequency from 1 Hz to 500 Hz. A technique for providing a pulsed electromagnetic signal is known and will not be described in detail. Suffice it to say here that the transmitted signal 122, for sake of example, has a pulse repetition period of one second and a pulse width of 400 milliseconds. If we assume that the transmitter 12 is providing a pulsed electromagnetic signal having a frequency of 10 Hz, then during one pulse, four periods of the transmitted electromagnetic signal is emanated. After the transmitter 12 has transmitted a pulse of 400 milliseconds, the transmitter stops transmitting for 600 milliseconds to provide a period for the receiver 16 to receive. A more efficient arrangement calls for the transmission of only one half cycle of the carrier (for instance 1 millisec-long pulse, for a 500 Hz carrier). The pause could be made, as an example, 6 millisecond long. After this pause, we could transmit another half-cycle. However, the polarity would now be reversed.

If we have to operate in shallow waters, we must use short pulses. An example will illustrate this case. Let's assume that the carrier is at 500 Hz. We transmit a half period of it, which is 1 millisecond long. We assume also that the depth of the sea is, say, 36 meter. We will be capable of receiving an echo from the bottom, it the system has enough margin in Signal-to-Noise ratio to afford 55.5 dB of skin depth losses (at 500 Hz, skin depth is 11.26 meter, and there are 8.68 dB losses for each skin depth). The delay of the echo from the bottom is about 2 millisecond, for a round trip. Because our pulse is 1 millisecond long, we will be capable of keeping available a time interval of 1 millisecond for the echoes that come back from targets that are in the water column, above sea bottom.

The sinusoidal signal provided within the transmitted pulse (this may contain several cycles of the carrier) is phase coherent with the transmitted envelope 122. That is, the sinusoidal signal has a zero degrees phase at the beginning of a pulse and a 360 degrees phase at the end of the pulse with the number of cycles experienced during the pulse depending upon the frequency of the sinusoidal signal. The latter reduces the amount of phase fluctuation and improves the accuracy of the radar system 10.

It should be appreciated that the first echo signal to return to the aircraft 110 is the first receive signal 124 which will be the pulse of 400 milliseconds duration delayed in time from the transmitted pulse by the time it takes for a signal to travel in air the distance from the aircraft 110 to the surface 114 of the sea water 112 and return to the aircraft 110 (i.e. two times the height of the aircraft 110 divided by $300 \times 10^6$ meters/second). This delay amounts to a few microseconds. The second signal to return to the aircraft 110 is the second receive signal 128 which is further delayed after the first receive signal 124 by the amount of time it takes for a signal to travel the distance from the surface 114 of the sea water 112 to the scattering disturbance 120 and return to the surface 114. For most of the time of the duration of each of the receive pulses, the transmit pulse and the first receive signal 124 will mask the second receive signal 128. Only a small portion 128a of the second receive signal 128 will not be hidden which can be used for detecting anomalies beneath the surface 114 of the sea water 112. Assuming the disturbance 120 is at a depth of 100 meters and wherein an electromagnetic signal having a frequency of 10 Hz travels in sea water at a speed of approximately $5 \times 10^3$ meters per second (See Table I), then a group delay (identical in this medium to two-way phase delay) of approximately 40 milliseconds exists between the first receive signal 124 and the second receive signal 128. Thus, the portion 128a of the second receive signal 128 will have a duration of 40 milliseconds which can then be processed by the receiver 16 for detecting conductivity anomalies. Since the frequency of the electromagnetic signal is 10 Hz, then each cycle has a period of 100 milliseconds so that approximately ⅖ths of a cycle is available for processing by the receiver 16. It should be appreciated that the receiver 16 should not be over driven immediately before the portion 128a of the second receive signal 128 is fed to the receiver 16. To accommodate such a requirement, the DSP 22 (FIG. 1) controls a switch to isolate the receiver 16 from the antenna 18 until it is desired for the antenna 18 to be connected to the receiver 16. This function can also be performed with a software approach, by "blanking-out" the output of the receiver for the entire duration of the radiated burst.

Undisturbed sea water has a certain conductivity profile along the vertical. If the water is stratified, this profile has a maxima and minima. The electromagnetic signal is propagating through the sea water 112. As the submarine 118 travels through the sea water 112, the submarine 118 induces a complex hydrodynamic phenomenon that includes turbulence, internal waves, eddies, vortices, etc. (i.e. it creates a wake), which changes the conductivity of that portion (i.e. the disturbance 120) of sea water. As the distance from the submarine 118 increases, the disturbance 120 will include internal waves and vortex waves and as the distance further increases, the disturbance 120 will include internal waves and vortex eddies. The latter provides a means to detect that the submarine 118 has passed by detecting the electrical conductivity perturbations.

An electromagnetic signal propagating through the sea water 112, having a certain conductivity, when striking the disturbance 120, having a different conductivity, is reflected and scattered and a portion of the reflected signal is reflected toward the aircraft 110. It should be appreciated that an electromagnetic signal propagating in sea water will have a different velocity of propagation depending upon the frequency of the electromagnetic signal. As described hereinabove, a signal having a frequency of 10 Hz will have in sea water a velocity of approximately $5 \times 10^3$ meters per second, whereas a signal having a frequency of 100 Hz will have a velocity of approximately $15.8 \times 10^3$ meters per second. From the above discussion, it should be remembered that only the portion 128a of the reflected signal 128 is used for detecting disturbances. If a frequency of 100 Hz is used instead of a frequency of 10 Hz, then the group delay (which, in sea water, and at the frequencies of interest here, is identical to the phase delay, so that the two terms can be used interchangeably) will have a duration of 12.6 millisecond. This means that this is the amount of time it takes for a signal to travel the distance from the surface 114 of the sea water 112 to the disturbance 120 and return to the surface 114 (assuming a depth of 100 meters). Using a frequency of 100 Hz, only a duration of 12.6 milliseconds is available for collecting useful data by the receiver 16. It should be noted, with a frequency of 100 Hz, a period of one cycle has a duration of ten milliseconds. Thus, during the 12.6 milliseconds duration the receiver 16 is receiving useful information, approximately 1 and ¼th of a cycle is available for processing by the receiver 16.

Although the first receive signal 124 is decoupled from the receiver 16 by a switch, other sources of unwanted noise (i.e. background clutter) may exist. For example, scatter from surface waves or ripples on the surface 114 provide unwanted signals to the receiver 16 during the desired receiving duration. Also perturbations in the conductivity of the sea water which are not caused by motion of a vessel provide unwanted background noise which affects the detection capability of the radar system 10. The latter affect the required signal to noise ratio of the radar system 10. Considering the operational requirements of the radar system 10, a maximum output power of 35 kilowatts is practical considering the isolation requirements between the receiver 16 and the transmitter 12. With the above output power limitation, to achieve a satisfactory signal to noise ratio, the radar system 10 must provide an antenna with a strong enough magnetic moment suitable to penetrate the sea water 112, strike a disturbance and provide a reflected signal strong enough for receiver 16 to process. To achieve the latter, a magnetic moment from approximately $10^6$ to $10^7$ ampere-meters$^2$ ($Am^2$) is required. Furthermore, wherein a pulsed signal is transmitted and since the duration of the usable receive signal is so short, a time constant of the order of approximately one millisecond is desired for the radar system 10 to minimize the harmful effects of ringing.

The receiver 16 processes the received signal and provides a signal to the DSP 22 wherein the signal is digitized and provides a two dimensional array of the received echo intensity versus time. The two dimensional array is fed to the display 24 wherein the two dimensional array is displayed to an operator. In the contemplated radar system 10, each frame of the two dimensional array corresponds to a time duration of approximately 1800 seconds, or thirty minutes. Each successive frame overlaps a preceding frame by 200 seconds, that is if the first frame of information displayed detected echo from the time zero to 1800 seconds, then the second frame of information displays detected echo from the time 1600 seconds to 3400 seconds. Conventional memory within the DSP 22 provides the necessary data storage so that the display 24 may display the array of the received echo intensity versus time.

Figure 2:
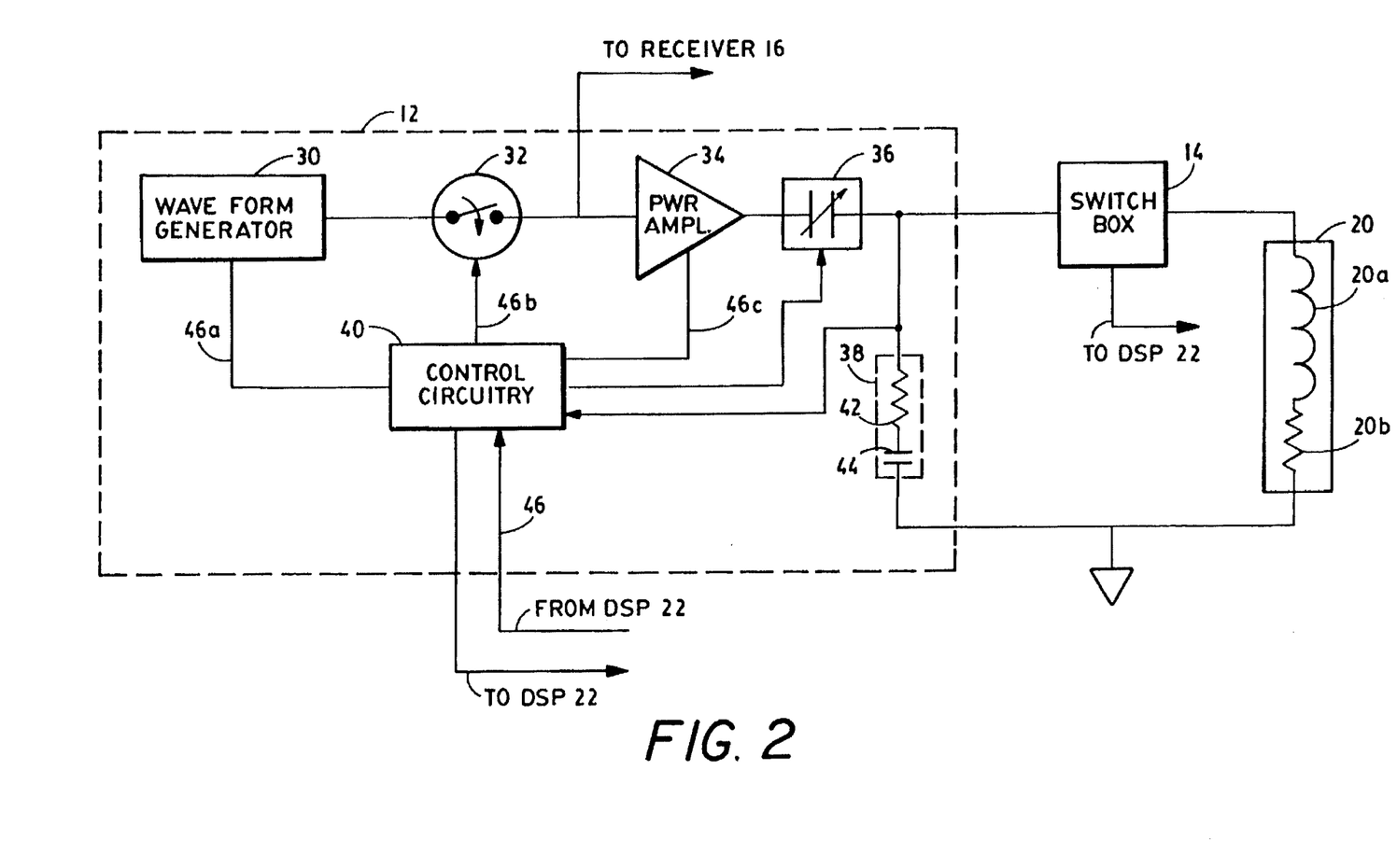
FIG. 2 is a simplified block diagram of the transmitter of the radar system of FIG. 1.

Referring now to FIG. 2, a block diagram of the transmitter 12 is shown to include a waveform generator 30, a switch 32, a power amplifier 34, a tuning capacitor 36, a snubber circuit 38 and control circuitry 40. The output of the transmitter 12 is coupled to the antenna 20, via the switch box 14, as shown. More particularly, the output of the transmitter 12 provides a pulsed electromagnetic signal preferably having a pulse width of 400 milliseconds and a pulse repetition interval of one pulse per second. Due to the relatively quick return time of the return signal and the short duration of the desired receive signal, a pulsed electromagnetic signal with a fast rise and fall time is desired, preferably one millisecond. It should be appreciated that, assuming a depth of 100 meters, an electromagnetic signal having a frequency of 100 Hz will typically provide a desired signal for 12.6 milliseconds, a frequency of 10 Hz will typically provide a desired signal for 40 milliseconds and a frequency of one Hz will typically provide a desired signal for 126 milliseconds. With the latter in mind, it is desirable for the antenna 20 to have a relatively short time constant. The time constant of the antenna 20 is controlled by an inductance component 20a and a resistive component 20b. A technique to reduce the time constant of the antenna 20 is to minimize its inductance. Here, this is achieved with the use of a solenoidal antenna with a "current sheet" winding as will be discussed hereinafter in conjunction with FIGS. 4 and 4A. The antenna 20, although designed with reduced inductance, typically includes an inductance of 11.2 millihenrys and a resistance of 0.2 ohms which provides an uncorrected time constant of 11.2/0.2=53 milliseconds. To further reduce the time constant, a technique of precisely controlling the timing of the coupling of the electromagnetic signal to the antenna 20 is utilized. That is the DSP 22 controls the opening and closing of switch box 14 so that the connection is broken when the current through antenna 20 falls to approximately zero amperes. Since the effect of this technique is to reduce the time constant, the use of the transmitter 12 is effectively equivalent to providing a synthetic impedance in series with the antenna 20 without the undesirable effect of increasing power consumption. Thus, the transmitter 12 may be referred to as a synthetic output impedance circuit.

The waveform generator 30 provides the desired electromagnetic signal having a frequency, for example, ten Hz when the desired frequency of the output signal is ten Hz. The output signal of the waveform generator 30 is controlled by the control circuitry 40 in response to a control signal from the DSP 22 (FIG. 1). The output of the waveform generator 30 is fed to a switch 32 which is controlled by the control circuitry 40 in response to a control signal from the DSP 22 (FIG. 1). The switch 32 is closed to provide the desired pulse width and open and closed at the desired pulse repetition frequency to provide the desired pulsed electromagnetic signal. The switch 32 is closed in a manner to ensure that the sinusoidal signal provided by the waveform generator 30 has a zero degrees phase when the switch is closed to begin a pulse and opened in a manner to ensure the sinusoidal signal has a 360 degrees phase when the switch is opened to end a pulse. The latter ensures the sinusoidal signal is phase coherent with the desired pulsed electromagnetic signal.

The pulsed electromagnetic signal is fed to an input of a power amplifier 34 to amplify the signal to the desired power output. The output of the amplifier 34 is coupled to a tuning capacitor 36, which when connected to the antenna 20 by the switch box 14, brings the antenna 20 to resonance at the desired frequency as controlled by a control signal from the control circuitry 40. Typically, in the preferred embodiment, the tuning capacitor 36 is set for a value of 4.21 millifarads to provide resonance at a frequency of approximately twenty five Hz and is set for a value of 1.65 millifarads to provide resonance at a frequency of approximately forty Hz. At frequencies below five Hz, the tuning capacitor is not required. Above forty Hz, the voltage across the tuning capacitor 36 becomes undesirable large, thus it is preferred to operate at frequencies below forty Hz. It should be appreciated that a bias voltage is developed across the tuning capacitor 36, here typically 1.2 kilovolts and as the switch box 14 selectively couples the transmitter 12 to the antenna 20, transients or voltage spikes typically experienced when providing a pulsed signal to an inductor (i.e. antenna 20) are minimized.

A portion of the output signal is coupled to the control circuitry 40 wherein control signals are provided to ensure the waveform generator and the switch 32 operate in a manner to provide the correct pulsed electromagnetic signal and to ensure the switch box 14 is opened only when the current of the transmitted electromagnetic signal is approximately zero amperes. By monitoring the transmitted electromagnetic signal, the phase and zero crossings of the signal are controlled so that the current is disabled from the antenna 20 when the current is exactly zero. At this moment, the voltage across the tuning capacitor 36 is at a maximum, here approximately 1,000 volts. When the next pulse is fed to the capacitor 36 and coupled to the antenna 20 by the switch box 14, the pulse is enhanced by the voltage across the tuning capacitor 36 reducing the effects of transients and ringing that would normally be associated when pulsating a large inductance as provided by the antenna 20.

The transmitter 12 also includes a snubber circuit 38 having a resistor 42 and a capacitor 44. The snubber circuit 38 dampens any transients or ringing caused by switching the electromagnetic signal to the antenna 20 not eliminated by the previously described techniques. Although the timing of the opening and closing of the switch box 14 is closely controlled, there may still be some residual transients and some ringing which are eliminated with the snubber circuit 38. Table II shows typical performance parameters for a transmitter 12 used in conjunction with the antenna 20.

Table II

| Parameter | 1 Hz | 5 Hz | 25 Hz | 40 Hz |
| --- | --- | --- | --- | --- |
| Antenna Voltage (V-RMS) | 80 | 142 | 80 | 80 |
| Antenna Current (A-RMS) | 391 | 391 | 391 | 391 |
| Tail Current Decay (MS) | <10 | <10 | <10 | <10 |
| Two-way Phase Delay (MS) | 126 | 40 | 25 | 20 |
| Power (KW) | 31 | 31 | 31 | 31 |
| Power (KVA) | 33 | 55 | 31 | 31 |
| Tuning Capacitor (MF) | No | No | 4.21 | 1.65 |
| Tuning Capacitor (V-RMS) | NA | NA | 1000 | 1500 |
| Load Disconnect Switch Req'd | No | No | Yes | Yes |
| Flux Density in Core (KGauss) | 10 | 10 | 10 | 10 |

Referring now to FIGS. 1 and 1B, received signals are captured by the antenna 18 and coupled to the receiver 16. In accordance with known techniques, a switch selectively connects the antenna 18 to the remaining portion of the receiver 16 as controlled by the DSP 22. Thus, during the period the first reflected signal 124 is incident on the antenna 18, the switch disconnects the antenna 18 from the receiver 16. During the period the portion 128a of the second reflected signal 128 is incident on the antenna 18, the switch is closed to connect the antenna 18 to the receiver 16 to provide a received signal. The received signal is fed to a phase lock loop. A portion of the transmitted signal from the transmitter 12 is also fed to the phase lock loop as a reference signal. Here the phase lock loop includes a set of nine phase shifters which control the amount of phase shift imparted to a signal propagating therethrough as controlled by a control signal fed from the DSP 22. A set of nine mixers interoperate with the set of nine phase shifters in the phase lock loop to provide nine output signals which are fed to nine corresponding matched filters. The latter provide an output signal upon detection of an echo signal. The output signal of the matched filters is fed to the DSP 22 wherein the signal is digitized and processed in accordance with known techniques.

Figure 3:
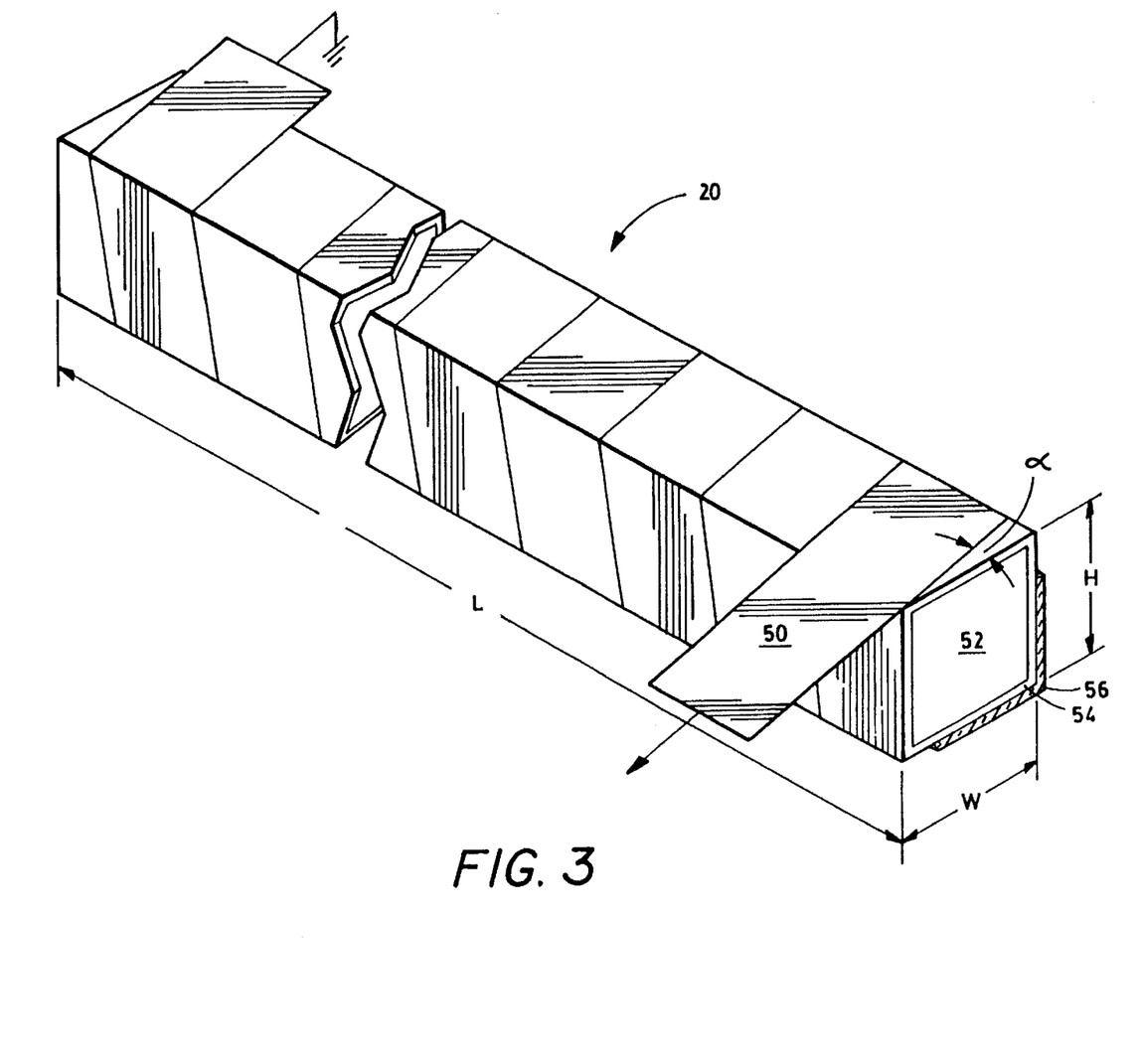
FIG. 3 is an isometric view of the antenna of the radar system of FIG. 1.
Figure 3A:
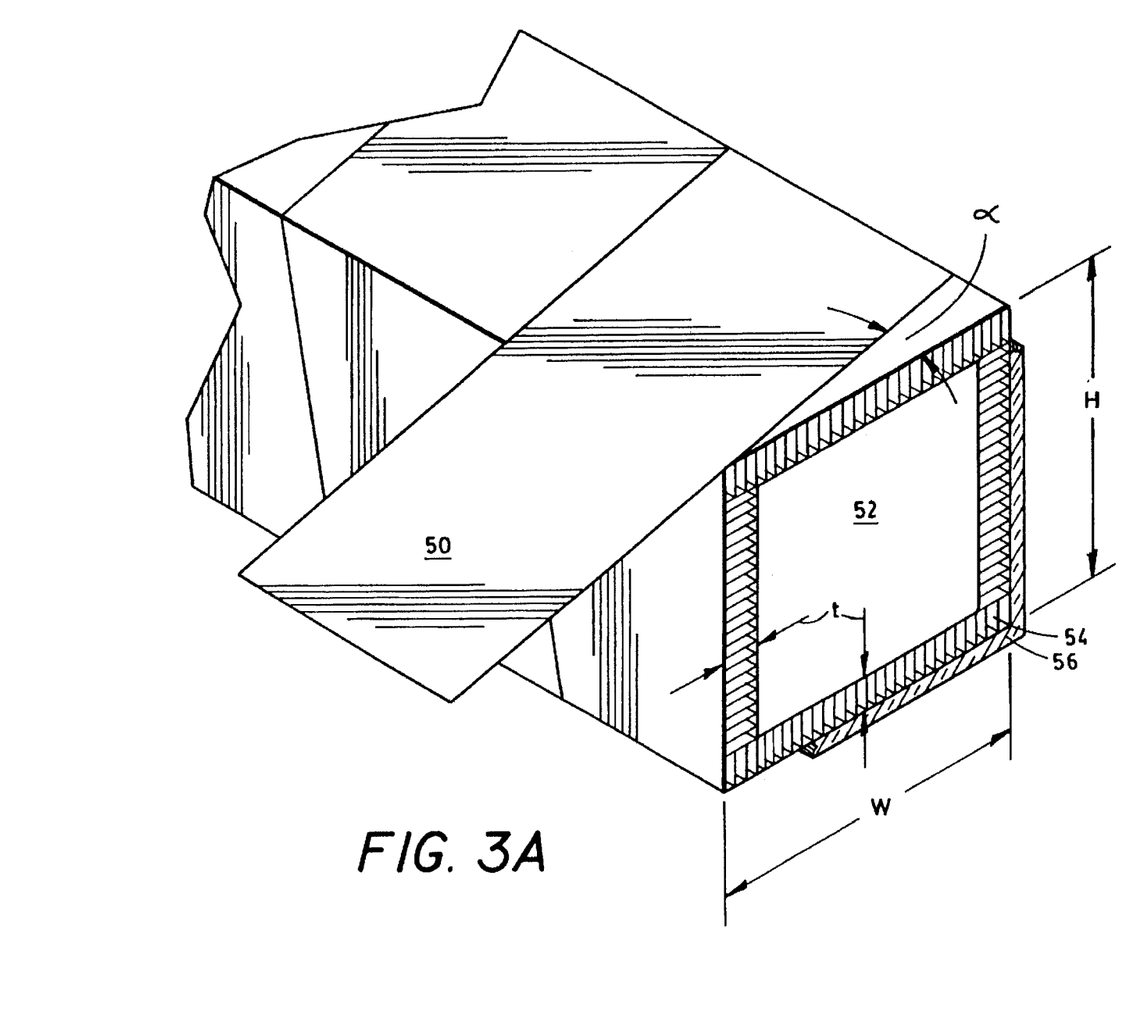
FIG. 3A is an enlarged isometric view of a portion of the antenna of the radar system of FIG. 1.

Referring now to FIGS. 3 and 3A, the construction of the antenna 20 is shown. The antenna 20 provides a low impedance and a high magnetic moment. The low impedance is required to ensure a short time constant required for the radar system 10 (FIG. 1). The antenna 20 is a Horizontal Magnetic Dipole (HMD) antenna instead of an Horizontal Electric Dipole (HED) antenna. For the frequencies required, an electric dipole antenna in air would require an unrealistic length to achieve resonance, and thus carry a large current. As described above, a magnetic moment of approximately $10^6$ to $10^7$ $Am^2$ is required for the contemplated radar system 10. The antenna 20 is a solenoidal antenna having a "sheet-like" winding provided by conductive sheet 50 wound in a helical pattern. The conductive sheet 50 is a copper foil having a thickness of ten millimeters and a width of approximately 330 millimeters: A dielectric beam 52 is disposed within the winding of the conductive sheet 50 to provide a support structure to maintain the mechanical integrity of the antenna 20. The dielectric beam 52 is comprised of a dielectric material, here wood, and has a square cross section. A laminated core 54 is disposed between the dielectric beam 52 and the winding of conductive sheet 50 to increase the magnetic moment of the antenna 20. The conductive sheet 50 is wrapped around the laminated core 54 at an angle α, here 13 degrees. Such an angle provides 45 turns of the conductive sheet 50 around the laminated core 54 at a length of 15 meters.

The laminated core 54 is comprised of a silicon-iron alloy, here a material known as ARMCO-ORIENTED M-6 material manufactured by National Material Co, of Arnold, Pa. The permeability of the laminated core 54 when fabricated from the M-6 material is at least 5000. The antenna 20, as shown, has a square cross-section with a height H and a width W of approximately 355 millimeters and a length L of approximately 15 meters.

It should be understood that the magnetic moment of a solenoidal type antenna is given by $P = N \cdot I \cdot A$, where P is the magnetic moment in $Am^2$, N is equal to the number of turns of the winding, I is the current flowing through the winding in Amperes and A is the cross-sectional area of the solenoid in square-meters. The inductance L of such a solenoidal type antenna is given by:

$$L = \frac{4\pi N^2 A}{l} \times 10^{-7},$$

where L is the inductance in Henrys and 1 is the length of the solenoid in meters. From the above, it is apparent that if the number of turns N in the winding is increased, the magnetic moment is increased. Unfortunately, the latter also increases the inductance by the square of the number of turns N. Thus, to minimize the inductance, it is desirable to minimize the number of turns of the winding. In the present antenna 20 using a conductive sheet 50 for the winding, the magnetic moment is characterized by the equation: $P_s = k \cdot A \cdot l$, where $P_s$ is the magnetic moment, A is the cross-sectional area of the solenoid in square-meters, 1 is the length of the solenoid in meters and k is the current density of the conductive sheet 50. From the above, k can be expressed as:

$$k = \frac{N \cdot I}{l}.$$

The inductance of the antenna 20 is given by:

$$L = \frac{4\pi N^2 A}{l} \times 10^{-7}.$$

Thus, the current density k of the antenna 20 can be increased without increasing the inductance thereof so that a high magnetic moment can be achieved without increasing the inductance caused by increasing the number of turns N.

The laminated core 54 is provided to increase the magnetic moment. Adding the laminated core 54 changes the equation for magnetic moment to: $P_s = \mu \cdot A \cdot l$, where μ is the permeability of the laminated core 54. The equation for inductance is also modified wherein:

$$L = \frac{\mu 4\pi N^2 A}{l} \times 10^{-7}.$$

It should be appreciated that the inductance of the antenna 20 is increased with the use of the laminated core 54 as well as increasing the magnetic moment. At an operating frequency of one Hz, the reactance of the antenna 20 is approximately 67.23 milliohms and at a frequency of five Hz, the reactance of the antenna 20 is approximately 336.15 milliohms. The resistance of the antenna 20 is approximately 200 milliohms. With the latter values, at a frequency of one Hz, approximately 35 KVA of reactance power is required to drive the antenna 20 and at a frequency of five Hz, approximately 55 KVA of reactance power is required to drive the antenna 20. Such power requirements are readily realizable in the contemplated radar system 10.

The laminated core 54 is comprised of lamination of a silicon and iron alloy having a relative permeability of 10,000 and a saturation flux of approximately fifteen kilogauss. With a hollow core, the laminated core 54 provides suitable permeability while minimizing the weight of the antenna 20. The laminated core 54 has a weight of 7.8 tons/$m^3$ (i.e. 498 lb/$ft^3$). The laminated core has a thickness t of approximately 3.5 centimeters, although a thickness t of 2.0 or 5.0 centimeters may also be suitable. The weight of a 15 meter long laminated core 54 having a thickness of 2.0, 3.5 and 5.0 centimeters is approximately 6602 lbs., 11,556 lbs. and 16,509 lbs., respectively. It is noted that, when trading off weight versus magnetic moment achieved due to a greater thickness, the 3.5 centimeter thickness was preferred. However, an increase in the amount of current fed to the antenna 20 will increase the magnetic moment of the antenna 20.

The antenna 20 is disposed in a dielectric box 56 (a portion of which is shown in FIGS. 3 and 3A) for mounting to the aircraft 110 (FIG. 1) and to protect the conductive sheet 50 from damage. A second different dielectric box (not shown) can be used as an external container to mount the dielectric box 56 within to provide additional protection from the environment for the antenna 20. As shown in FIG. 1, the antenna 20 is disposed in the underside of the fuselage of the aircraft 110. Alternatively, the antenna 20 could be mounted in a housing attached to the aircraft 110 by a towline. If the antenna 20 is mounted in the underside of the fuselage of the aircraft 110, then shielding is provided between the antenna 20 and the inside of the aircraft to reduce the electromagnetic field intensity to a level believed to be safe for human exposure.

Figure 4:
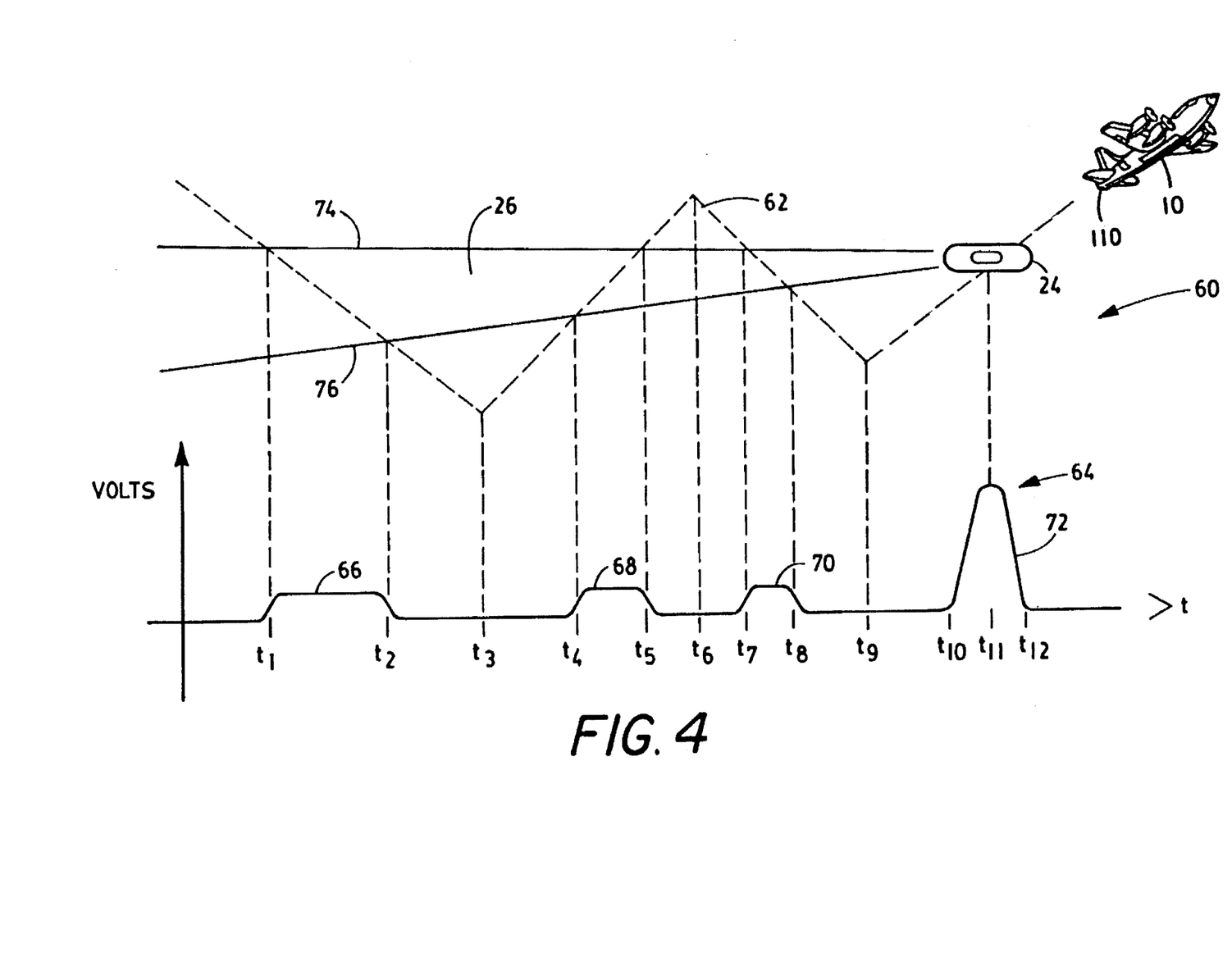
FIG. 4 is an exemplary scene of an airplane travelling over a target along with a displayed waveform corresponding to the detection of the target by the radar system of FIG. 1.

Referring now to FIG. 4, an exemplary detection scene is shown with a submarine 24 creating a wake 26 which trails behind. An aircraft 110 is shown with the path of the aircraft 110 shown by a dotted line labelled 62. The aircraft 110 upon encountering the wake 26, travelled in a zigzag pattern crossing the wake 26 multiple times until catching up to the submarine 24 and passing the submarine 24 as shown. A corresponding plot of the anticipated waveform generated in response to return signals received by the radar system 10 is shown with time plotted along the abscissa and amplitude plotted along the ordinate. At a time $t_1$, the aircraft encounters the wake 26 and the radar system 10 receives an echo signal which continues until a time $t_2$ when the aircraft 110 travels beyond the wake 26. At a time $t_3$, the aircraft 110 changes course and at a time $t_4$ encounters the wake 26. Again an echo signal is received until a time $t_5$ when the aircraft 110 travels beyond the wake 26. At a time $t_6$, the aircraft 110 again changes course and at a time $t_7$ encounters the wake 26 and receives an echo signal. At a time $t_8$, the aircraft 110 travels beyond the wake 26. It should be noted that as the aircraft 110 travels closer to the submarine 24 crossing the wake 26, the duration of the echo signal decreases since the wake 26 is getting narrower. The latter indicates that the aircraft is travelling in a direction toward the submarine 24. At a time $t_9$, the aircraft 110 changes course and, in this instance, at a time $t_{10}$ encounters the submarine 24, at a time $t_{11}$, crosses the center of the submarine 24, and at a time $t_{12}$, travels beyond the submarine 24. It should be noted in most instances, the aircraft 110 would not necessarily cross over directly the submarine, but if such an occurrence does occur then the amplitude of the echo signal received is greater than that of an echo signal received from the wake 26.

Figure 5:
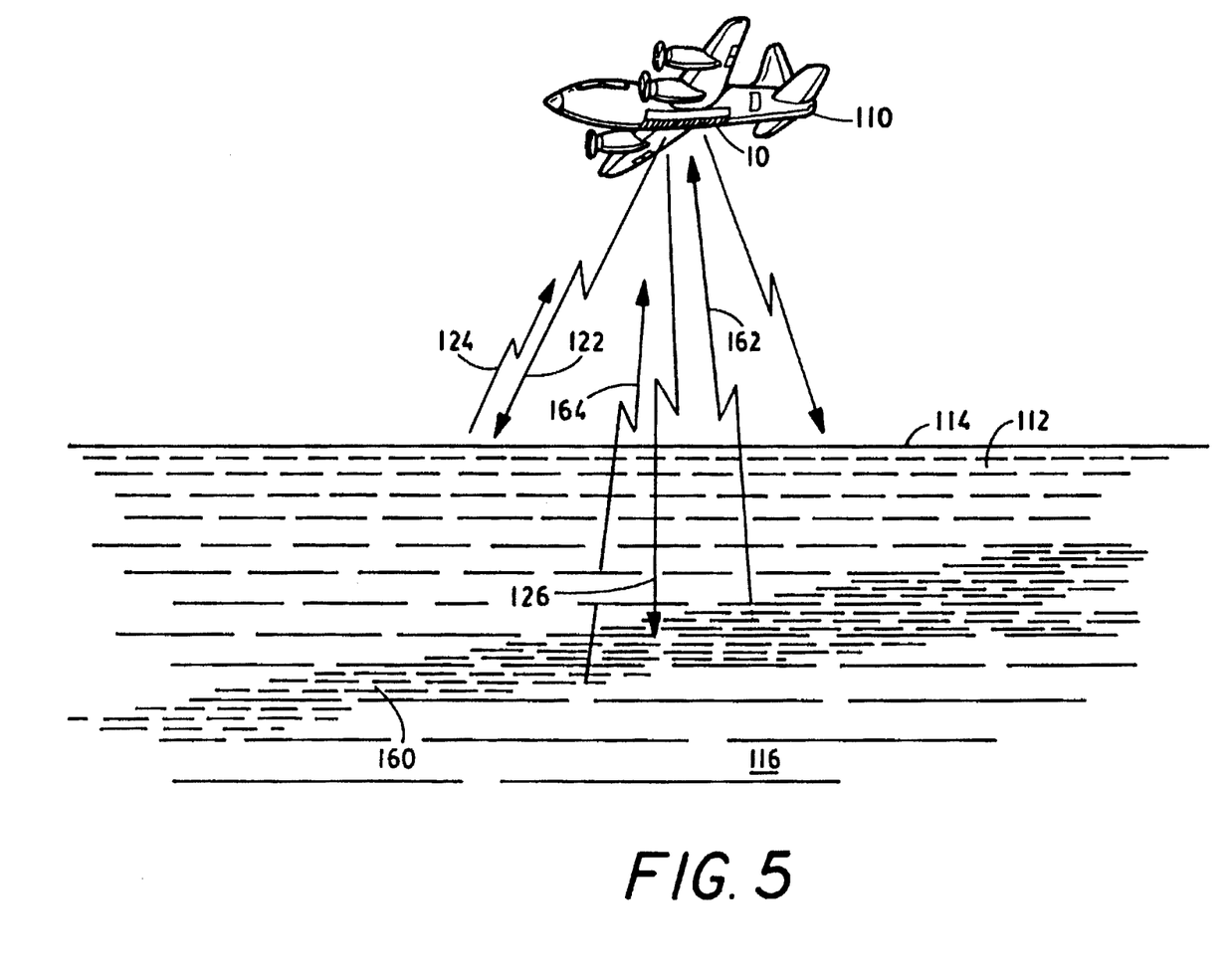
FIG. 5 is a diagram of a radar system mounted in an aircraft in an alternative engagement according to the invention.

Referring now to FIG. 5, an alternative use of the radar system 10 mounted on an aircraft 110 is shown. The radar system 10 will emanate an electromagnetic signal 122 toward a surface 114 of sea water 112. A portion of the electromagnetic signal 122 is reflected by the surface 114 of the sea water 112 as a first reflected signal 124 and a portion of the electromagnetic signal 122 will enter below surface 116 of the sea water 112 as an underwater signal 126. The underwater signal 126 will propagate through the sea water 112 until striking a conductivity disturbance, here an oil plume 160. It should be appreciated that the conductivity of a plume of oil will be vastly different than that of sea water. Upon striking the oil plume 160, a portion of the underwater signal 126 will be reflected as a second reflected signal 162. The second reflected signal 162 will propagate through the sea water 112 until reaching the surface 114 wherein the second reflected signal 162 will enter the air and propagate toward the aircraft 110. A portion of the second reflected signal 162 will be captured by the radar system 10 as a second received signal to be processed as described hereinbefore.

Furthermore, a portion of underwater signal 126 will propagate through the oil plume 160 and when reaching the bottom of the oil plume 160 where sea water is again encountered, a portion of the underwater signal 126 will be reflected as a third reflected signal 164. The third reflected signal 164 will propagate through the oil plume 160 and the sea water 112 until reaching the surface 114 wherein the third reflected signal 164 will enter the air and propagate toward the aircraft 110. A portion of the third reflected signal 164 will be captured by the radar system 10 as a third received signal to be processed as described hereinbefore. The radar system 10 processes the second and third received signals to detect the presence of an under water oil plume. The second received signal determines the depth of the top of the oil plume 160 and the third received signal determines the depth of the bottom of the oil plume 160. By flying aircraft 110 around the area above the oil plume 160, the radar system 10 can map the shape of the oil plume 160 and over time determine the movement of the oil plume 160. From the latter, the direction and dispersion rate of the oil plume 160 can be determined.

It should be appreciated that the antenna 20 would also work well in a low frequency communication system wherein it is desirable to communicate from above the water's surface to beneath the water's surface. For example, a one way communication signal to a deeply submerged submarine, a low data rate emergency communication signal or an underwater rescue beacon signal could be communicated from above the water's surface to below the water's surface or vice versa.

Having described this invention, it will now be apparent to one of skill in the art that changes may be made without departing from the disclosed concept. It is felt, therefore, that this invention should not be restricted to its disclosed embodiment, but rather should be limited only by the spirit and scope of the appended claims.

What is claimed is:

1. A magnetic dipole antenna comprising:
   means for providing a magnetic moment for transmitting electromagnetic signals having a frequency less than 500 Hz comprising:
   (a) a beam of dielectric material;
   (b) a core having a permeability of at least 5000; and
   (c) a conductive sheet wound in a helical pattern around the beam of dielectric material and the core, each winding of the helical pattern disposed adjacent an adjacent winding to provide a magnetic dipole.

2. The magnetic dipole antenna as recited in claim 1 wherein the core comprises a silicon and iron alloy.

3. The magnetic dipole antenna as recited in claim 2 wherein the core comprises a lamination of the silicon and iron alloy.

4. The magnetic dipole antenna as recited in claim 3 wherein the core and the beam has a square cross section.

5. The magnetic dipole antenna as recited in claim 4 wherein the conductive sheet is comprised of copper.

6. The magnetic dipole antenna as recited in claim 5 wherein the conductive sheet has a thickness of approximately ten millimeters and a width of approximately 330 millimeters.

7. The magnetic dipole antenna as recited in claim 6 further comprising a housing comprised of a dielectric material, wherein the conductive sheet, the core and the beam are disposed within the housing.

8. The magnetic dipole antenna as recited in claim 1 wherein the core has a square cross-section with a height and width of approximately 355 millimeters and a length of approximately 15 meters.

9. The magnetic dipole antenna as recited in claim 1 wherein the magnetic moment is greater than $10^6$ Am$^2$.

10. An electromagnetic radar system for transmitting an electromagnetic signal comprising:
  (a) transmitter means for providing a pulsed electromagnetic signal having a frequency less than 500 Hz; and
  (b) a magnetic dipole antenna fed by said pulsed electromagnetic signal, said magnetic dipole antenna comprising means for providing a magnetic moment comprising:
    (i) a beam of dielectric material;
    (ii) a conductive sheet wound in a helical pattern around the beam of dielectric material, each winding of the helical pattern disposed adjacent an adjacent winding to provide a magnetic dipole; and
    (iii) a core having a permeability of at least 5000 disposed between the beam of dielectric material and the conductive sheet.

11. The electromagnetic radar system as recited in claim 10 further comprising:
  (a) a switch means, connected between said transmitter means and said magnetic dipole antenna and responsive to a switch control signal, for selectively connecting and disconnecting said transmitter means to said magnetic dipole antenna; and
  (b) controller means for providing the switch control signal to the switch means for disconnecting said transmitter means from said magnetic dipole antenna at a moment when the current of the pulsed electromagnetic signal is at a zero level.

12. The electromagnetic radar system as recited in claim 10 wherein the core comprises a lamination of silicon and iron alloy.

13. The electromagnetic radar system as recited in claim 12 wherein the conductive sheet is comprised of copper.

14. The electromagnetic radar system as recited in claim 13 wherein the conductive sheet has a thickness of approximately ten millimeters and a width of approximately 330 millimeters.

15. The electromagnetic radar systems as recited in claim 10 wherein the magnetic moment is greater than $10^5$ Am$^2$.

16. An electromagnetic radar system for transmitting an electromagnetic signal comprising:
  (a) transmitter means for providing a pulsed electromagnetic signal having a frequency less than 500 Hz; and
  (b) means, fed by said pulsed electromagnetic signal, for providing a low impedance and a high magnetic moment comprising:
    (i) a beam of dielectric material;
    (ii) a conductive sheet wound in a helical pattern around the beam of dielectric material; and
    (iii) a core disposed between the beam of dielectric material and the conductive sheet;
  (c) a switch means, connected between said transmitter means and said providing a low impedance and a high magnetic moment means and responsive to a switch control signal, for selectively connecting and disconnecting said transmitter means to said providing a low impedance and a high magnetic moment means; and
  (d) controller means for providing the switch control signal to the switch means for disconnecting said transmitter means from said providing a low impedance and a high magnetic moment means at a moment when the current of the pulsed electromagnetic signal is at a zero level.

* * * * *